Sept. 9, 1930.  E. G. TEMPLETON  1,775,626

COLLAPSIBLE MECHANISM FOR TIRE CORES

Filed Nov. 25, 1927

INVENTOR
Edwin G. Templeton,
BY
ATTORNEY

Patented Sept. 9, 1930

1,775,626

UNITED STATES PATENT OFFICE

EDWIN G. TEMPLETON, OF AKRON, OHIO, ASSIGNOR TO THE GOODYEAR TIRE & RUBBER COMPANY, OF AKRON, OHIO, A CORPORATION OF OHIO

COLLAPSING MECHANISM FOR TIRE CORES

Application filed November 25, 1927. Serial No. 235,456.

My invention relates to apparatus for fabricating pneumatic tire casings and it has particular relation to building cores employed in the process of assembling the various elements of a tire casing.

The primary object of my invention is to provide a simple and highly efficient mechanism for collapsing a segmental tire core.

Another object of the invention is to provide a simple and easily operated means for maintaining the core sections in operative position.

In the manufacture of pneumatic tire casings a rotatable core which may be either toroidal or cylindrical in form is employed. Generally, these cores are composed of a number of pivoted segments adapted to be so collapsed that assembled tire casings may be removed therefrom. The core mechanisms heretofore employed have usually been defective, in certain respects, some of them being too complicated for satisfactory commercial use while others have been lacking in efficiency. A machine constructed according to the provisions of my invention is designed to obviate these disadvantages.

For a better understanding of my invention, reference may now be had to the accompanying drawings, forming a part of this specification, in which.

Figure 1:
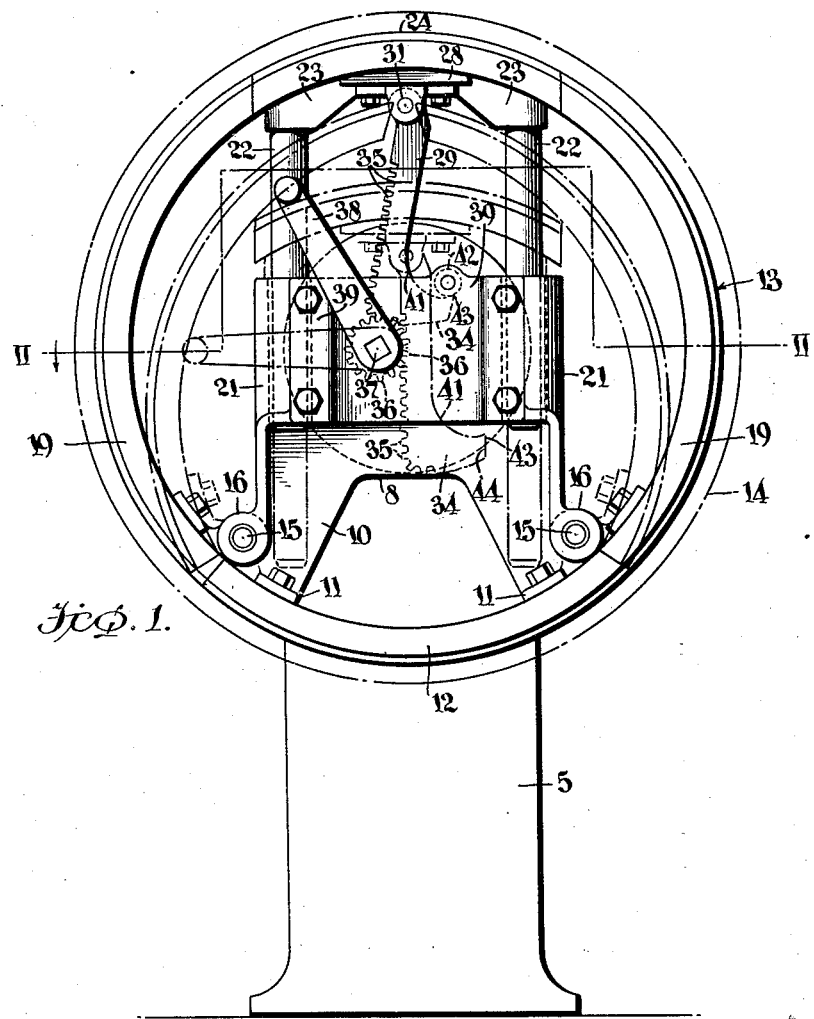
Fig. 1 is an elevational view of a machine embodying my invention.
Figure 2:
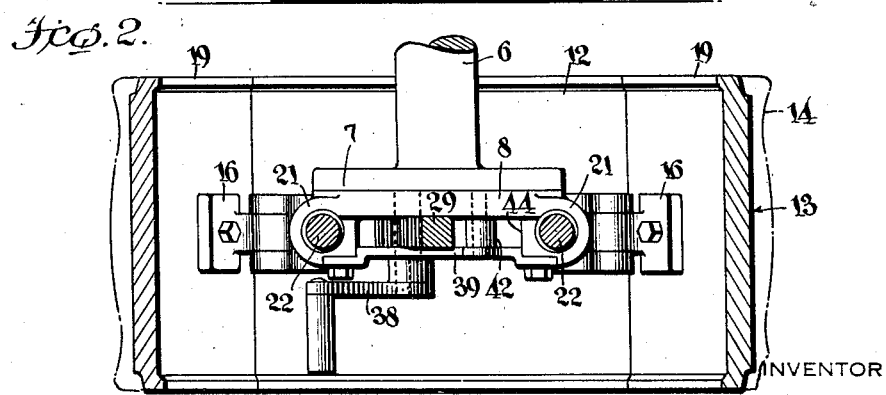
Fig. 2 is a cross-sectional view taken substantially along the line II—II of Fig. 1, showing various internal elements of the apparatus embodying my invention.

In practising my invention, I provide a base or pedestal 5 that supports a rotatable shaft 6 driven by any suitable source of power (not shown). One end of the shaft 6 is provided with a disc like head 7 having rigidly attached thereto a web or spider member 8. A portion of the latter is cut out to form radially arranged legs or spokes 10, the extremities of which are provided with attaching flanges 11 that are rigidly bolted to a section 12 of a cylindrical core or drum 13 adapted to support a tire carcass or band 14. The portions 10 of the spider member are provided, adjacent the section 12, with enlarged bifurcated portions that are bored to receive pins 15 of a pair of hinged members 16 having core sections 19 bolted thereto.

The web member 8 is provided with parallel thickened edge portions 21 bored to receive slidably supporting rods or shafts 22 projecting upwardly and secured to lugs 23 upon the lower side of a radially movable key section 24 of the building core.

The latter section is provided intermediately of the lugs 23, with a downwardly projecting bracket 28 to which an actuating rack bar 29 is pivotally attached by means of a pin 31. The bar is provided, at its lower end, with an angularly projecting portion 34 and has a series of rack teeth 35 formed along one edge thereof and extending along the lower edge about the angular portion 34. The rack teeth engage a pinion 36 mounted upon a shaft 37 having a crank arm 38 secured thereto, and journalled in openings formed in a plate 39 bridging the space between the thickened portions 21.

The side of the rack bar opposite the gear teeth and the upper side of the projection 34 are shaped into a cam surface 41 that engages a roller 42 mounted between the plate 39 and the web member 8. The angular portion 34 is machined along an edge 43, whereby, as indicated by the dot and dash lines in Figure 1, it slidably engages a guide surface 44 formed along the inner edge of the adjacent thickened portion 21 and projecting therebelow.

To collapse the core from the full line position shown in Figure 1, the crank 38 is rotated in a clockwise direction, thus causing the lower end of the rack bar 29 to be swung laterally so that the rack teeth along the side of the bar 29 engage the operating gear 36.

During the initial stages of the movement, the rack teeth are held in engagement with the gear by the action of the roller 42 upon the cam surface 41.

Continued rotation of the crank 39 causes the rack teeth on the side of the rack bar 29 to engage the gear 36, whereby the bar is actuated downwardly and the surface 43 of the projecting lug 41 then slidably engages the guide surface 44 and the rack bar is thus guided downwardly to move the key section 24 inwardly to the position indicated in dot and dash lines in Fig. 1. After the key section has been thus moved to the inoperative position, the segments 19 may be collapsed to the position indicated in dot and dash lines in the above mentioned figure and a tire band 14 upon the machine may then be removed. The core segments are restored to their operative position by rotating the crank arm in the reverse direction. When the core is in its expanded position, the rack teeth upon the lower side of the angular portion 34 engage the gear 36 and any inward force upon the core section 24 is transmitted radially against the gear 36. Therefore, there is little or no tendency so to rotate the latter member as to collapse the core.

It will be apparent that I have provided a tire core collapsing mechanism that is extremely simple in construction and in operation. One important advantage of a device embodying my invention lies in the fact that during the initial stages of the inward movement of the core section 24, the rack teeth along the lower edge of the angular projection engage the gear 36. As the rack bar is swung about its pivot there is only a slight radial movement of the section 24. A decided advantage is obtained by this operation of the elements mentioned, as it enables the operator readily to overcome the resistance due to a tendency of the tire carcass to adhere to the key section and to friction between the ends of the core sections 24 and the segments 19.

Although I have illustrated but one form which my invention may assume and have described that form in detail, it will be apparent to those skilled in the art that it is not so limited but that various modifications may be made therein without departing from the spirit of the invention or from the scope of the appended claims.

What I claim is:

1. In a collapsible tire building core a plurality of relatively movable segments, a member having an angular portion, teeth disposed along both the member and the angular portion, means operatively connecting the angular member to one of the segments and a pinion engaging the teeth for moving the last mentioned segment radially and locking it in position.

2. In a tire fabricating mechanism a base, a rotatable shaft mounted thereon, a spider secured rigidly to the shaft, a cylindrical core comprising hinged sections secured to the spider, parallel guide rods slidably secured in the spider member, a key section attached to the outer end of the rods adapted to be moved inwardly to permit collapsing of the core, a rack secured to the key section and a pinion journaled upon the spider and engaging the rack for actuating the key section inwardly to permit collapsing movement of the core sections.

3. In a machine for fabricating tires a base, a rotatable shaft mounted upon the base, a core supporting member mounted upon the shaft, hinged core sections secured to the core supporting member, a radially movable key section secured to the core supporting member, a rack pivoted to the key section and having an angularly directed portion at its lower end, a pinion rotatably secured to the core supporting member and engaging both the rack and the angularly disposed portion and an actuating crank secured to the pinion.

4. In a machine for fabricating tires a base, a shaft rotatably mounted upon the base, a core supporting member rigidly secured to the shaft, a pair of inwardly movable core sections secured to the sides of the core supporting member, a pair of slidable rods mounted upon the core supporting member, a key section secured to the outer ends of the rods, a rack pivoted to the key member and having an angularly directed portion at its lower end, a cam surface formed on one face of the rack and on the upper side of the angularly directed portion, a guide roller adapted to engage the cam surface, and a pinion secured to the drum supporting member to engage with the teeth of the rack member.

5. In a machine for fabricating tires a base, a spider rotatably mounted on the base, collapsible core sections secured to the spider, guide rods secured to one of the core sections and slidably secured to the spider, a rack hinged to the latter core section to swing in the plane of the core and a pinion upon the spider engaging the rack.

6. In a machine for fabricating tires a base, a spider rotatably mounted on the base, collapsible core sections secured to the spider, guide rods secured to one of the core sections and slidably mounted in the spider, a bar hinged to the core, said bar having teeth along one side and along its free end, a gear on the spider meshing with the teeth, a cam surface on the bar and a roller engaging the cam to guide the bar.

7. In a tire fabricating mechanism, a supporting base, a shaft rotatably mounted upon the base, a spider rigidly secured to one end of the shaft, core sections hingedly secured to the spider, guide rods mounted upon the spider for sliding motion in the plane of the core sections, a key section secured to the outer ends of the guide rods, a rack bar hinged to the key section, and gear means engaging the free end of the rack bar for securing it against inward movement of the key section.

In witness whereof, I have hereunto signed my name at Akron, in the county of Summit and State of Ohio, this 23rd day of November, 1927.

EDWIN G. TEMPLETON.